United States Patent
Jones et al.

(10) Patent No.: US 6,275,331 B1
(45) Date of Patent: Aug. 14, 2001

(54) OPTICAL AMPLIFIERS

(75) Inventors: Kevan P Jones, Totnes; Roger M Gibb, Paignton; Robert A Baker, Newton Abbot; Martin P Poettcker, Totnes; Mark E Bray; Barrie Flintham, both of Paignton; James Regan, Staverton; Toby J Reid, Torquay, all of (GB); Alan A Solheim, Kanata (CA); Robert W Keys, Stittsville (CA); Mark R Hinds, Ottawa (CA); Joseph Mun, London (GB); Nigel E Jolley, Herts (GB); Alan Robinson, Harlow (GB); Jonathan P King, Epping (GB); Simon P Parry, Harlow (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/345,063

(22) Filed: Jun. 30, 1999

(51) Int. Cl.⁷ .......................... H04B 10/213; H04B 10/17
(52) U.S. Cl. ........................... 359/341.44; 359/341
(58) Field of Search .................... 359/341, 349, 359/177, 124

(56) References Cited

U.S. PATENT DOCUMENTS

| | | | |
|---|---|---|---|
| 4,953,939 | 9/1990 | Epworth | 264/1.27 |
| 5,452,124 * | 9/1995 | Baker | 359/341 |
| 5,636,601 | 6/1997 | O'Sullivan et al. | 359/173 |
| 5,671,074 * | 9/1997 | Tomooka | 359/176 |
| 5,748,363 * | 5/1998 | Duck et al. | 359/341 |
| 5,764,404 * | 6/1998 | Yamane | 359/341 |
| 5,812,306 * | 9/1998 | Mizrahi | 359/341 |
| 5,837,169 | 11/1998 | Rourke | 123/90.11 |
| 5,959,749 * | 9/1999 | Danagher | 359/124 |
| 6,008,920 * | 12/1999 | Hendrix | 359/634 |
| 6,061,484 * | 5/2000 | Jones | 359/127 |
| 6,122,096 * | 9/2000 | Fatehi | 359/341 |

FOREIGN PATENT DOCUMENTS

| | | | | |
|---|---|---|---|---|
| 0 751 635 A2 * | 2/1997 | (EP) | | H04B/10/08 |
| 0 878 721 A1 | 11/1998 | (EP) . | | |
| 9704539 | 2/1997 | (WO) | | H04B/10/08 |
| WO 97/04539 * | 2/1997 | (WO) | | H04B/10/08 |
| WO 98/08322 * | 2/1998 | (WO) | | H04J/14/02 |
| 9808322 | 2/1998 | (WO) | | H04J/14/02 |

* cited by examiner

Primary Examiner—Thomas H. Tarcza
Assistant Examiner—Deandra M. Hughes
(74) Attorney, Agent, or Firm—Lee, Mann, Smith, McWilliams, Sweeney & Ohlson

(57) ABSTRACT

In a WDM optical transmission system employing optical amplifiers in its transmission path, a supervisory signal channel, used for monitoring and controlling the operation of the amplifiers and spectrally separated from the data transmission, may be multiplexed with the data. A construction of amplifier is disclosed which is capable of being upgraded with an upgrade of the transmission system to include additional data handling capacity, for instance data transmission in an additional waveband and/or in the opposite direction, without interruption of the pre-upgrade data transmission path through the amplifiers. This is accomplished by the use of channel dropping and insertion filters disposed so that the amplifying data transmission path extends via the drop/insertion channel of those filters.

4 Claims, 5 Drawing Sheets

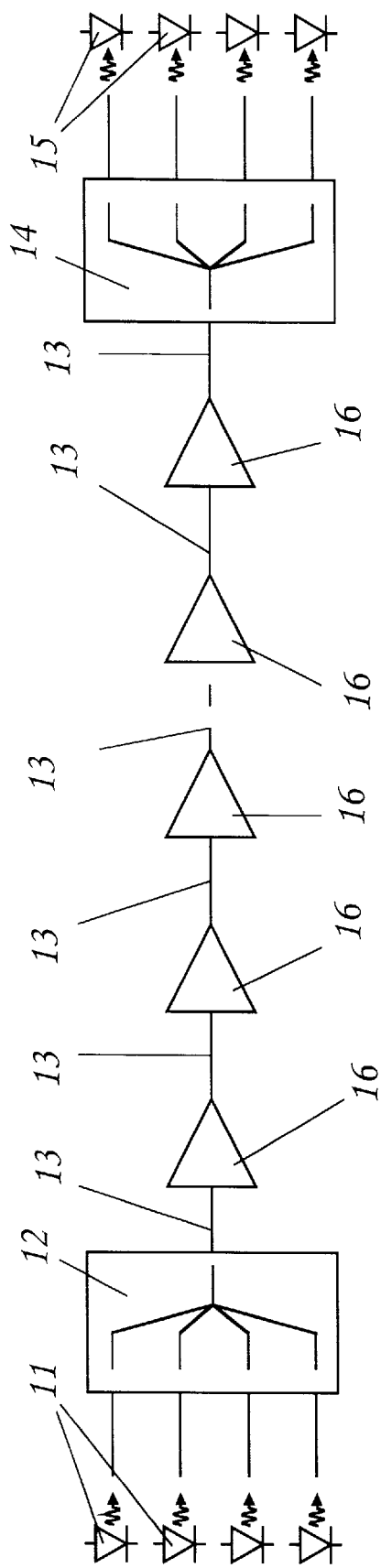
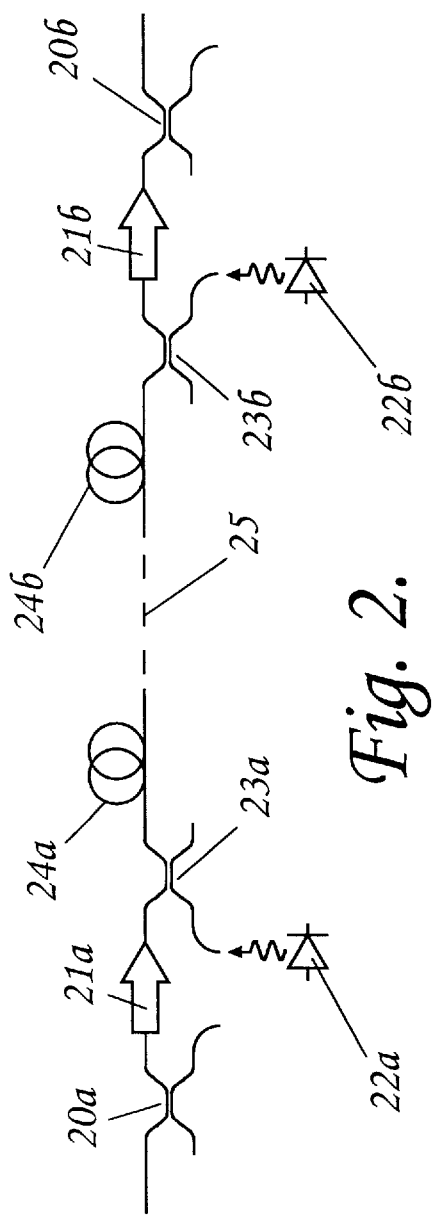

OPTICAL AMPLIFIERS

FIELD OF THE INVENTION

This invention relates to optical amplifiers for optically amplified transmission systems, and in particular to optical amplifiers that employ erbium doped fibre amplification.

BACKGROUND TO THE INVENTION

In a transmission system employing erbium doped fibre amplifiers (EDFAs), the optical data signal may be conveyed along with an optical service signal used for servicing the transmission system, this service signal being used at least in part for monitoring and controlling the operation of the optical amplifiers of the system. The channel used for conveying the optical service signal, the optical service channel, does not need to lie within the amplification band of the optical amplifiers. This is because the service signal needs to be available for use at those amplifiers, and hence can readily be regenerated (reconstituted) at those amplifiers. Indeed it is generally advantageous to choose, for the optical service channel, a waveband lying outside the amplification waveband so as not to take up bandwidth that would otherwise be available for the transmission of data. Thus a simple unidirectional wavelength division multiplexed (WDM) transmission system incorporating EDFAs in its transmission path typically has its WDM data signals lying within the conventional amplification band (C-band) of an EDFA that extends from approximately 1525 nm to approximately 1565 nm, this WDM data being itself wavelength multiplexed with an optical service signal lying in an optical service channel typically nominally at 1480 nm, 1510 nm or 1610 nm.

At each amplifier, the service channel is picked off before the data is amplified, and then, after the data has been amplified, a fresh service channel signal is re-multiplexed with the amplified data. The picking off of the old service channel signal, and reinsertion of the new, is typically effected by means of obliquely oriented dielectric filters designed to reflect everything except for the optical service channel, which they transmit. (In principle, it is possible to use the inverse configuration in which the filters transmit everything except for the optical service channel, which they reflect. This however is not generally the preferred option because reflection loss can generally be made smaller than transmission loss, and it will generally be preferred to minimise the attenuation of the data, rather than that of the service channel signals.)

For a given route, the anticipated traffic demand may initially be too small to warrant the extra expense involved in the installation of a higher capacity system. Later however, an upgrade of the system may become desirable in order to meet increased traffic demand. Such an upgrade may involve conversion from a unidirectional transmission system to one carrying bi-directional traffic. Alternatively, or additionally, a traffic handling capacity increase may be accomplished by incorporating one or more additional amplification wavebands into the system, for instance the EDFA extended amplification band (E-band) that lies between approximately 1565 nm and approximately 1610 nm.

SUMMARY OF THE INVENTION

An object of the present invention is to provide a form of optical amplifier that can be upgraded without breakage of the existing data transmission path through the amplifier.

According to a first aspect of the present invention there is provided an optical amplifier having a gain block between a spectrally matched pair of filters consisting of a wavelength demultiplexing channel dropping filter and a wavelength multiplexing channel insertion filter, wherein the gain block includes a length of optically amplifying optical waveguide and an optical pump therefor, wherein the channel dropping filter is provided with an input port, and output port and a channel drop port, wherein the channel insertion filter is provided with an input port, an output port and a channel insertion port, and wherein the channel drop port of the channel dropping filter is optically coupled with the channel insertion port of the channel insertion filter via the gain block.

The invention also resides in optical transmission systems incorporating amplifiers of the type defined in the preceding paragraph.

According to a second aspect of the present invention there is provided a method of providing an optical amplifier that amplifies data within a first spectral band with a facility to amplify data in a non-overlapping second spectral band, which amplifier has a gain block and supervisory circuitry connected in parallel between a wavelength demultiplexing first spectral band channel dropping filter and a wavelength multiplexing first spectral band channel insertion filter, wherein the gain block includes a length of optically amplifying optical waveguide and an optical pump therefor, wherein the channel dropping filter is provided with an input port, and output port and a channel drop port, wherein the channel insertion filter is provided with an input port, an output port and a channel insertion port, wherein the gain block is provided with an input and an output connected respectively to the channel drop port of the channel dropping filter and the channel insertion port of the channel insertion filter, and wherein the supervisory circuitry is provided with an input and an output connected respectively to the output port of the channel dropping filter and the input port of the channel insertion filter, which method includes the step of modifying the supervisory circuitry to provide additional facility for supervising the second spectral band amplification, the step of breaking the connections between the input and output of the supervisory circuitry and the output and input ports respectively of the channel dropping and channel insertion filters, the step of restoring the broken connections respectively via second spectral band channel dropping and channel insertion filters, wherein the second spectral band channel dropping filter is provided with an input port, and output port and a channel drop port, and wherein the second spectral band channel insertion filter is provided with an input port, an output port and a channel insertion port, and the step of connecting a further gain block between the channel drop and channel insertion ports of the second spectral band channel dropping and channel insertion filters.

Alternatively, the places of the second spectral band channel dropping and channel insertion filters may be interchanged.

Other features and advantages of the invention will be readily apparent from the following description of preferred embodiments of the invention, from the drawings and from the claims.

BRIEF DESCRIPTION OF THE DRAWINGS

FIG. 1 is a schematic representation of a WDM transmission system employing optical amplifiers in its transmission path, FIG. 2 is a schematic representation of a gain block of one of the amplifiers of FIG. 1.

DETAILED DESCRIPTION OF PREFERRED EMBODIMENTS

Figure 3:
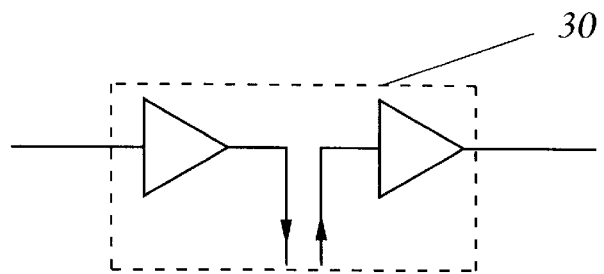
FIG. 3 is a simplified schematic representation of the gain block of FIG. 2.

A schematic representation of a WDM unidirectional optical transmission system incorporating optical amplifiers is depicted in FIG. 1. At the transmitter end of this system, the data modulated outputs of a number of optical sources 11 are combined in some form of wavelength multiplexing device 12, and are launched into a transmission path 13 that connects the transmitter end of the system to its receiver end. At the receiver end, the wavelength multiplexed data modulated signals are demultiplexed in some form of demultiplexer 14 so that they can be separately detected by detectors 15. At spaced intervals along the transmission path 13 are located optically pumped optical amplifiers 16.

Though not separately illustrated in FIG. 1, the transmission system incorporates some form of supervisory system that is conveyed optically in an optical service channel that is wavelength multiplexed with the data on the transmission path 13. At each amplifier, the service channel signal is picked off before the data is amplified in a gain block, and then a reconstituted service channel signal is remultiplexed with the data after that data has been amplified in the gain block.

A schematic representation of the elements of a typical gain block is illustrated in FIG. 2. This gain block has first and second signal strength monitoring taps 20a, 20b, optical isolators 21a, 21b, optical pump laser diodes 22a, 22b, optical pump multiplexers 23a, 23b, and lengths of erbium doped optically amplifying fibre 24a, 24b that are series connected by means of a link 25. Typically the gain block is assembled in a way that allows the link to be completed at a later stage in order that the link shall be constructed to have the form and functionality appropriate to the particular environment in which that gain block is to be operated. By way of example, the link may consist of or include an optical attenuator, a dispersion compensator, or a channel drop and insertion facility. This type of gain block assembly is sometimes known as an 'uncommitted mid-stage access' gain block and, for the purposes of the later figures of this specification, the provision of such an uncommitted mid-stage access gain block will be represented by the symbol depicted at 30 in FIG. 3.

Figure 4:
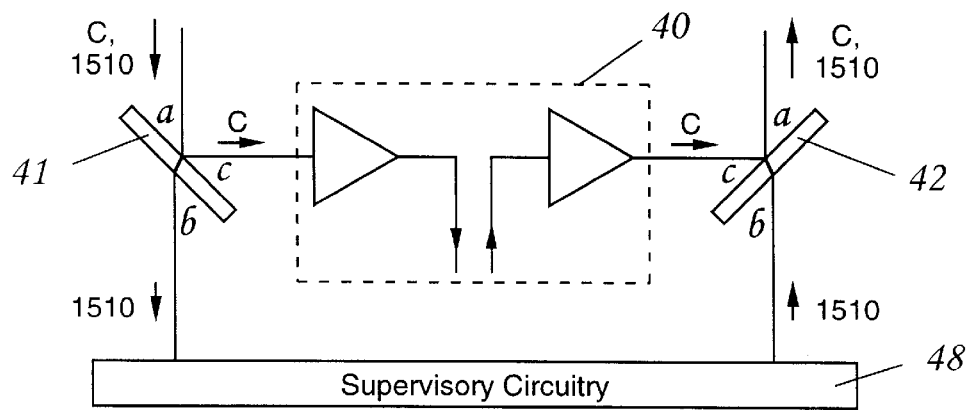
FIG. 4 is a schematic representation of one of the amplifiers of FIG. 1 incorporating a gain block as represented in FIG. 3, FIGS. 5 and 6 are schematic representations of alternative forms of upgrading of the amplifier of FIG. 4.

An amplifier embodying the present invention in a preferred form is schematically represented in FIG. 4. This amplifier is designed for use in a unidirectional WDM transmission system that includes EDFAs and has its data channels lying within the erbium C-band. This amplifier has a gain block 40 located between two 3-port dielectric filters 41 and 42 respectively acting as channel dropping and channel insertion filters. Both filters have ports 'a', 'b' and 'c'. In respect of light incident upon either filter by way of its port 'a', that portion of the light within the C-band (c. 1525 nm–1565 nm) is reflected to emerge by way of port 'c', while light of wavelengths beyond the extremities of this band is transmitted to emerge from the filter by way of port 'b'. Thus, when employed as a channel dropping filter, port 'a' functions as the input port, port 'c' functions as the channel drop port, and port 'b' functions as the express path output port. When employed as a channel insertion filter, port 'b' functions as the express path input port, port 'c' functions as the channel insertion port, and port 'a' functions as the output port.

The arrangement of the two filters 41 and 42 in relation to the gain block 40 is such that the input to the gain block is taken from the channel drop port 'c' of filter 41 while the output of gain block 40 is delivered to the channel insertion port 'c' of filter 42. Any optical supervisory channel signal received by the amplifier of FIG. 4, and that lies outside the C-band, such as a signal at 1510 nm, is directed by filter 41 to emerge by way of its express path output port 'b', from where it is directed to supervisory circuitry 48. This supervisory circuitry then generates a reconstituted supervisory signal which it applies to the express path input port 'b' of filter 42.

After an optically amplified transmission system has been installed whose amplifiers are of the form described above with particular reference to FIG. 4, there may come a time when it is desired to upgrade the system. One way of upgrading the system is to maintain the system as a unidirectional system, and to provide additional data channels lying in a different waveband, for instance the E-band (c. 1565 nm–1610 nm).

Figure 5:
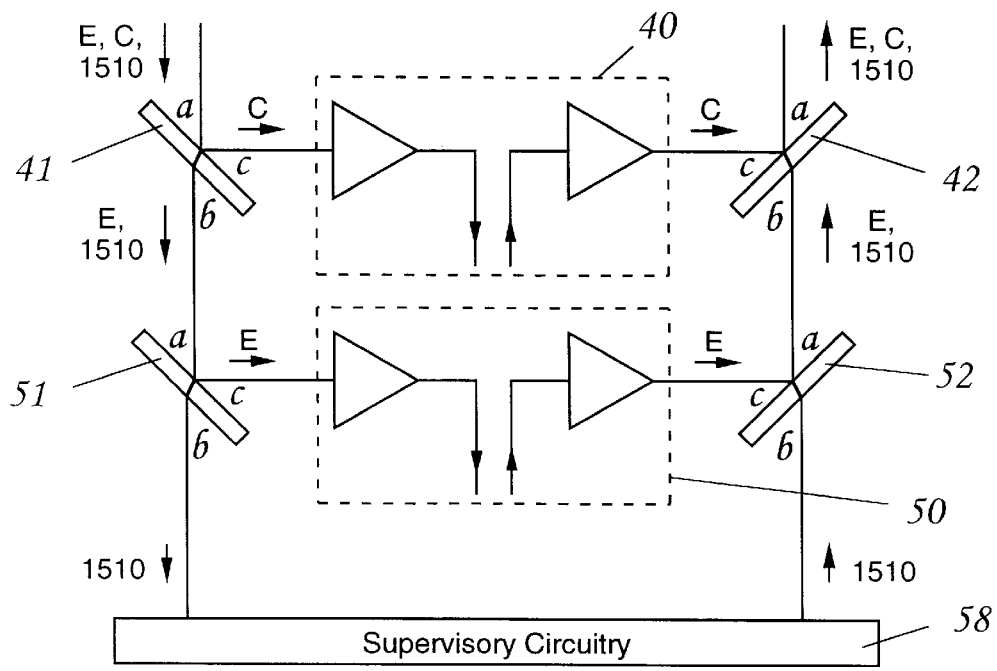

FIG. 5 shows how the amplifier of FIG. 4 may be adapted to handle the additional channels. The optical path through the amplifier from port 'a' of filter 41, through its port 'c', the gain block 40, port 'c' of filter 42, and through to its port 'a', is left undisturbed.

The optical paths from port 'b' of filter 41 to the supervisory circuitry, and from the supervisory circuitry to port 'b' of filter 42, are both interrupted by the insertion respectively of two further filters 51 and 52. These filters 51 and 52 differ from their counterparts, filters 41 and 42, only in that their respective drop and insertion wavebands compass the E-band instead of the C-band. Between the ports 'c' of filters 51 and 52 is connected a gain block 50 which differs from gain block 40 in that gain block 50 is designed for amplification of signals in the E-band rather than for those in the C-band. The original supervisory circuitry 48 may be replaced with new supervisory circuitry 58 provided with the necessary additional facilities for supervising the E-band data.

Figure 6:
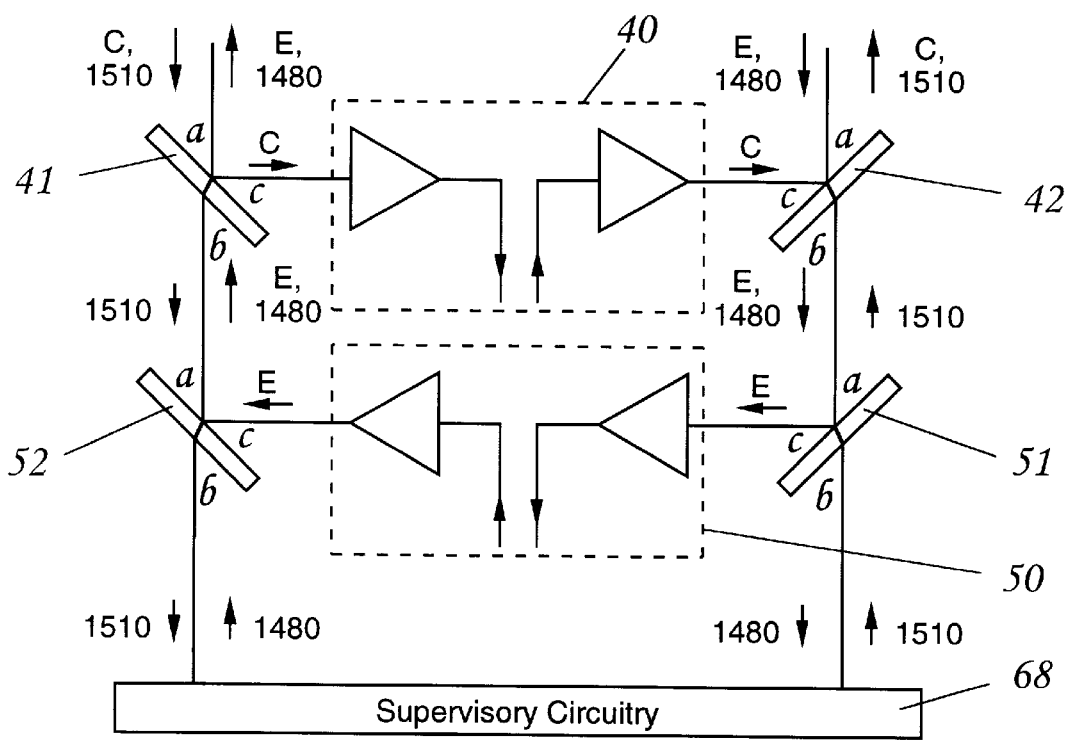

FIG. 6 shows a different adaptation of the amplifier of FIG. 4, in this instance for operation in a transmission system which is being upgraded to provide bidirectional data transmission. The data transmission within the C-band is unchanged, but to this is added the transmission of further data, in the opposite direction, this further data lying in channels within the E-band. This adaptation similarly leaves intact the optical path through gain block 40 from port 'a' of filter 41 to port 'a' of filter 42, and similarly involves the insertion of the additional filters 51 and 52, and gain block 50 previously mentioned in connection with the amplifier of FIG. 5. For the amplifier of FIG. 6, the connections of the gain block 50 are reversed so that it amplifies in the opposite direction, and the positions of the two filters 51 and 52 are interchanged, though this interchange is of course nugatory if, as may generally be the case, these two filters 51 and 52 are physically identical. The original supervisory circuitry 48 is replaced with new supervisory circuitry 68 provided with the necessary additional facilities for supervising the E-band data that typically includes a separate supervisory signal for each direction of transmission, for instance a supervisory signal at 1510 nm for one direction, and another at 1480 nm for the other direction.

Figure 7:
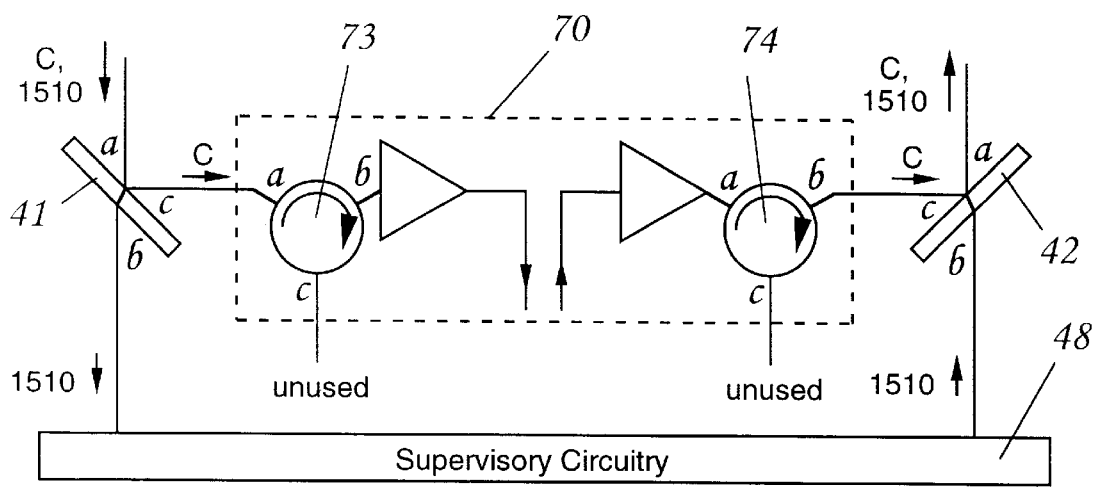
FIG. 7 is a schematic representation of one of the amplifiers of FIG. 1 incorporating a modified version of the gain block of FIG. 3, and FIGS. 8 and 9 are schematic representations of progressive forms of upgrading of the amplifier of FIG. 7.

FIG. 7 is a schematic representation of an amplifier which differs from that of FIG. 4 only in respect of its gain block 70. This gain block 70 differs from the gain block 40 of FIG. 4 in that first and second 3-port circulators 73 and 74 replace the first and second isolators 21a and 21b (FIG. 2). Ports 'a' and 'b' of the circulators 73 and 74 respectively take the place of the input and output ports of the isolators 21a and 21b, while ports 'c' of the circulators 73 and 74 remain unused.

Figure 8:
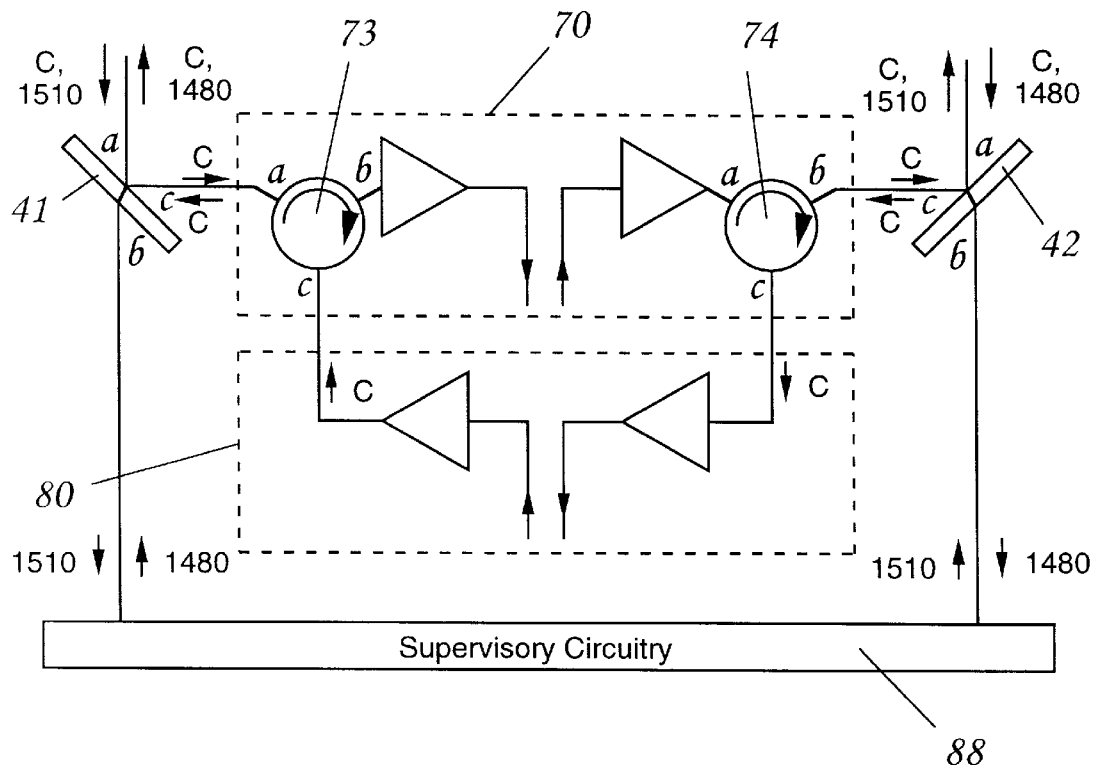

A feature of an optically amplified transmission system whose amplifiers are of the form described above with particular reference to FIG. 7 is that it can be subsequently upgraded, without interrupting the original data path through its amplifiers, from a unidirectional system to a bi-directional one carrying data in both directions in the same waveband. This contrasts with the bi-directional amplifier of FIG. 6, in which the data flow in one direction all lies in a waveband spectrally separated from that in which the data flow in the other direction lies. This upgrading of the amplifiers can be accomplished as depicted in FIG. 8. The optical path through the amplifier from port 'a' of filter 41, through its port 'c', the gain block 70, port 'c' of filter 42 and through to its port 'a' is left undisturbed. However, by the addition of gain block 80, an optical path in the reverse direction, i.e. from port 'a' of filter 42 through to port 'a' of filter 41, is established. This gain block 80 is connected between ports 'c' of circulators 73 and 74. Typically, though not necessarily, this gain block 80 differs from gain block 40 of FIG. 4 by the absence of isolators 21a and 21b, whose function is taken by the circulators 73 and 74 of gain block 70 between which this gain block 80 is connected. The original supervisory circuitry 48 may be replaced with new supervisory circuitry 88 possessing additional facilities for supervising the new data propagating in the reverse direction.

A bidirectional C-band transmission system employing amplifiers of the type described above with reference to FIG. 8 can itself be upgraded by the addition of a further amplification band, for instance the E-band. To adapt each of the amplifiers of the system to handle the additional band, it is not necessary to break the existing C-band transmission paths through that amplifier. The upgrade can be accomplished by making the changes depicted in FIG. 9. The optical path through the amplifier from port 'a' of filter 41, through its port 'c',. the gain block 70, port 'c' of filter 42, and through to its port 'a', is left undisturbed, as also is the optical path in the reverse direction through gain block 80. The optical paths from port 'b' of filter 41 to the supervisory circuitry, and from the supervisory circuitry to port 'b' of filter 42, are both interrupted by the insertion, respectively, of two further filters 51 and 52 identical with the E-band filters 51 and 52 of FIG. 5. Between the ports 'c' of filters 51 and 52 is connected a gain block 90 which differs from gain block 70 in that gain block 90 is designed for amplification of signals in the E-band rather than for those in the C-band. Gain block 90 has two circulators 93 and 94 which correspond to the circulators 73 and 74 of gain block 70, and between these two circulators 93 and 94 of gain block 90 is connected a gain block 95 which differs from gain block 80 in that it also is designed for amplification of E-band signals, rather than for those in the C-band. The original supervisory circuitry 48 may be replaced with new supervisory circuitry 98 possessing additional facilities for supervising the additional data.

Figure 9:
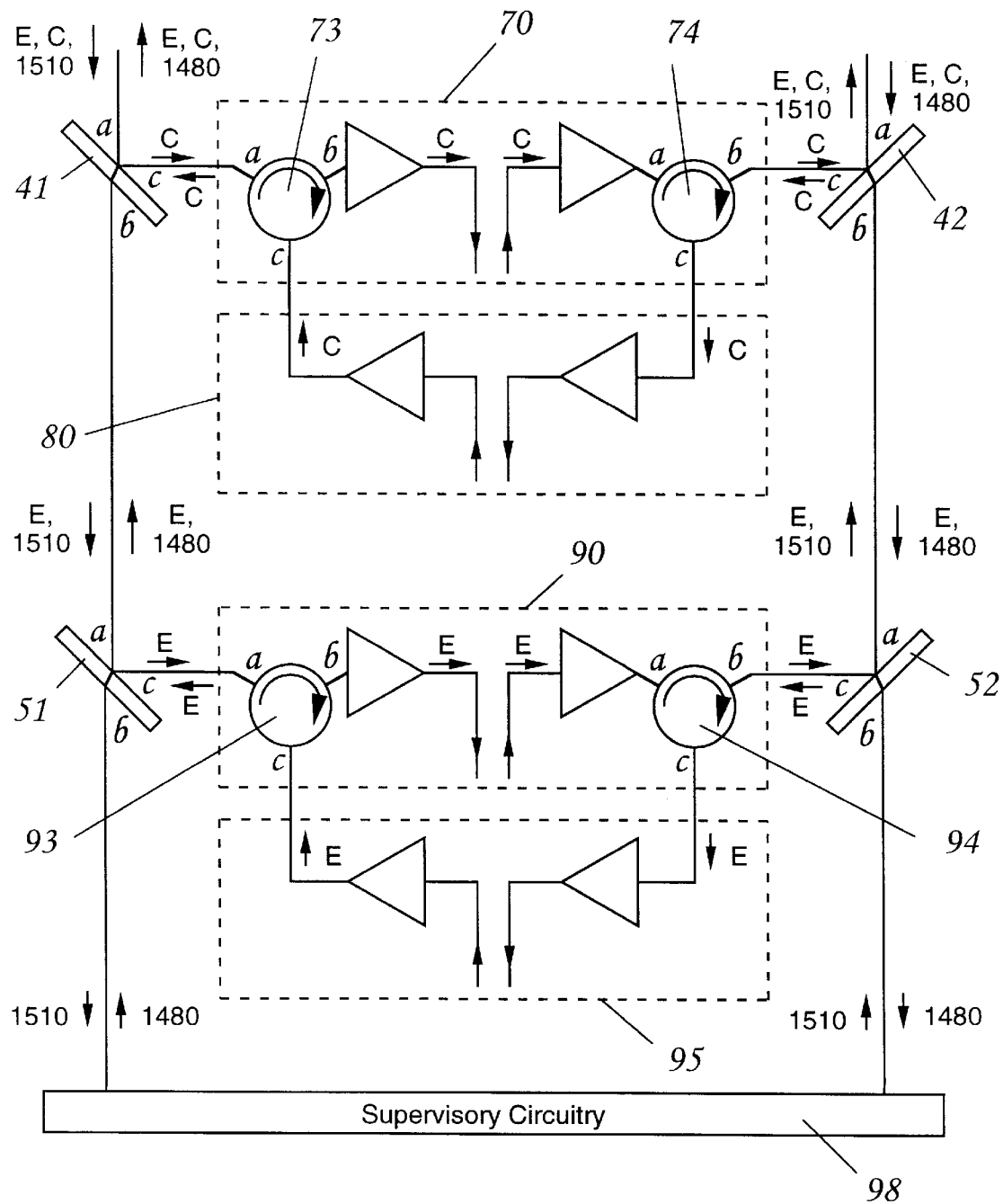

The upgraded amplifiers of FIGS. 5, 6 and 9 have each involved the addition of a further amplification band without disruption of the pre-upgrade data transmission path. It should be appreciated that this kind of addition process can be further extended by the addition of yet further data amplification bands, such as the addition of a Raman amplification band, for instance in the spectral regions in the vicinity of 1450 nm and/or 1310 nm.

Each of the dielectric filters of FIGS. 3 to 8 is depicted as a spectrally selective reflection filter that is reflective to light within a specific restricted wavelength range and transmissive to wavelengths outside that range. It is to be understood however that, with appropriate obvious minor layout changes, the place of any or all of these spectrally selective reflection filters can be taken by its corresponding inverse, namely a spectrally selective transmission filter that is transmissive to light within a specific restricted wavelength range and reflective to wavelengths outside that range.

What is claimed is:

1. An optical amplifier having a gain block between a spectrally matched pair of filters consisting of a wavelength demultiplexing channel dropping filter and a wavelength multiplexing channel insertion filter, wherein the gain block includes a length of optically amplifying optical waveguide and an optical pump therefor, wherein the channel dropping filter is provided with an input port, and output port and a channel drop port, wherein the channel insertion filter is provided with an input port, an output port and a channel insertion port, and wherein the channel drop port of the channel dropping filter is optically coupled with the channel insertion port of the channel insertion filter via the gain block.

2. An optical transmission system including in a transmission path thereof at least one optical amplifier as claimed in claim 1.

3. A method of providing an optical amplifier that amplifies data within a first spectral band with a facility to amplify data in a non-overlapping second spectral band, which amplifier has a gain block and supervisory circuitry connected in parallel between a wavelength demultiplexing first spectral band channel dropping filter and a wavelength multiplexing first spectral band channel insertion filter, wherein the gain block includes a length of optically amplifying optical waveguide and an optical pump therefor, wherein the channel dropping filter is provided with an input port, and output port and a channel drop port, wherein the channel insertion filter is provided with an input port, an output port and a channel insertion port, wherein the gain block is provided with an input and an output connected respectively to the channel drop port of the channel dropping filter and the channel insertion port of the channel insertion filter, and wherein the supervisory circuitry is provided with an input and an output connected respectively to the output port of the channel dropping filter and the input port of the channel insertion filter, which method includes the step of modifying the supervisory circuitry to provide additional facility for supervising the second spectral band amplification, the step of breaking the connections between the input and output of the supervisory circuitry and the output and input ports respectively of the channel dropping and channel insertion filters, the step of restoring the broken connections respectively via second spectral band channel dropping and channel insertion filters, wherein the second spectral band channel dropping filter is provided with an input port, and output port and a channel drop port, and wherein the second spectral band channel insertion filter is provided with an input port, an output port and a channel insertion port, and the step of connecting a further gain block between the channel drop and channel insertion ports of the second spectral band channel dropping and channel insertion filters.

4. A method of providing an optical amplifier that unidirectionally amplifies data within a first spectral band with a facility to amplify bidirectionally data in a said first spectral band, which amplifier has a gain block and supervisory circuitry connected in parallel between a wavelength demultiplexing first spectral band channel dropping filter and a wavelength multiplexing first spectral band channel insertion filter, wherein the gain block includes, between first and second optical circulators, a length of optically amplifying optical waveguide and an optical pump therefor, wherein the channel dropping filter is provided with an input port, and output port and a channel drop port, wherein the channel insertion filter is provided with an input port, an output port and a channel insertion port, wherein the gain block is provided with an input and an output connected respectively to the channel drop port of the channel dropping filter and the channel insertion port of the channel insertion filter, and wherein the supervisory circuitry is provided with an input and an output connected respectively to the output port of the channel dropping filter and the input port of the channel insertion filter, which method includes the step of modifying the supervisory circuitry to provide additional facility for supervising bidirectional amplification, and the step of connecting a further gain block between the first and second optical circulators.

* * * * *